(12) United States Patent
Ramesh et al.

(10) Patent No.: US 10,706,052 B2
(45) Date of Patent: Jul. 7, 2020

(54) METHOD FOR PERFORMING IN-MEMORY HASH JOIN PROCESSING IN RELATIONAL DATABASE SYSTEMS

(71) Applicant: Teradata US, Inc., Dayton, OH (US)

(72) Inventors: Bhashyam Ramesh, West Marredpally (IN); Sai Pavan Kumar Pakala, Andhra Pradesh (IN); Jaiprakash G Chimanchode, Old Alwal (IN)

(73) Assignee: Teradata US, Inc., San Diego, CA (US)

( * ) Notice: Subject to any disclaimer, the term of this patent is extended or adjusted under 35 U.S.C. 154(b) by 150 days.

(21) Appl. No.: 15/849,881

(22) Filed: Dec. 21, 2017

(65) Prior Publication Data

US 2018/0113909 A1 Apr. 26, 2018

Related U.S. Application Data

(62) Division of application No. 15/631,224, filed on Jun. 23, 2017.

(60) Provisional application No. 62/354,288, filed on Jun. 24, 2016, provisional application No. 62/354,262, filed on Jun. 24, 2016.

(51) Int. Cl.
| | |
|---|---|
| *G06F 16/30* | (2019.01) |
| *G06F 16/2455* | (2019.01) |
| *G06F 16/21* | (2019.01) |
| *G06F 16/215* | (2019.01) |
| *G06F 16/27* | (2019.01) |
| *G06F 16/28* | (2019.01) |
| *G06F 16/22* | (2019.01) |
| *G06F 16/901* | (2019.01) |
| *G06F 16/2453* | (2019.01) |
| *G06F 11/14* | (2006.01) |
| *G06F 9/38* | (2018.01) |

(52) U.S. Cl.
CPC .... *G06F 16/24552* (2019.01); *G06F 11/1435* (2013.01); *G06F 16/211* (2019.01); *G06F 16/215* (2019.01); *G06F 16/2255* (2019.01); *G06F 16/2456* (2019.01); *G06F 16/24537* (2019.01); *G06F 16/24544* (2019.01); *G06F 16/278* (2019.01); *G06F 16/284* (2019.01); *G06F 16/9014* (2019.01); *G06F 9/3887* (2013.01)

(58) Field of Classification Search
CPC ......... G06F 16/24254; G06F 16/24552; G06F 16/24536
USPC ....... 707/607, 609, 687, 705, 769, 790, 813, 707/821
See application file for complete search history.

(56) References Cited

U.S. PATENT DOCUMENTS

| | | | |
|---|---|---|---|
| 6,944,633 B1* | 9/2005 | Higa | G06F 16/2471 |
| 2016/0350375 A1* | 12/2016 | Das | G06F 16/24542 |
| 2017/0011115 A1* | 1/2017 | Cheung | G06F 16/334 |

\* cited by examiner

*Primary Examiner* — Sana A Al-Hashemi
(74) *Attorney, Agent, or Firm* — James Stover

(57) ABSTRACT

A method for performing in-memory hash join processing. This method utilizes bulk processing within the hash join steps, such as performing bulk reads of hash values from tables to be joined, and performing bulk probes of hash values in tables to be joined, thereby providing more efficient utilization of memory bandwidth and CPU throughput, reducing memory accesses in the execution path, and reducing CPU cycles per instruction. Data movement is reduced by reducing load-stores to memory and by performing more operations in CPU cache.

12 Claims, 6 Drawing Sheets

METHOD FOR PERFORMING IN-MEMORY HASH JOIN PROCESSING IN RELATIONAL DATABASE SYSTEMS

CROSS REFERENCE TO RELATED APPLICATIONS

This application is a divisional application of U.S. patent application Ser. No. 15/631,224; entitled "HASH TABLE STRUCTURE FOR OPTIMIZING HASH JOIN OPERATIONS IN A RELATIONAL DATABASE SYSTEM" by Bhashyam Ramesh, Sai Pavan Kumar Pakala, and Muthukumaran Raveendiran; filed on Jun. 23, 2017. U.S. patent application Ser. No. 15/631,224 claims priority under 35 U.S.C. § 119(e) to the following United States Provisional patent applications:

Provisional Patent Application Ser. No. 62/354,288, entitled "DATABASE IN-MEMORY HASH OPERATIONS," filed on Jun. 24, 2016, by Bhashyam Ramesh, Suresh Kumar Jami, Douglas P. Brown, Sai Pavan Pakala, Muthukumaran Raveendiran, Jaiprakash G. Chimanchode, Mohan Kumar K J, and Ravindar Munjam; and Provisional Patent Application Ser. No. 62/354,262, entitled "DECIDING COLUMN PARTITIONS FOR IN-MEMORY OPTIMIZED SPOOL," filed on Jun. 24, 2016, by Bhashyam Ramesh, Sai Oavan Kumar Pakala, Jaiprakash G. Chimanchode, Venketa Ramana Jyothula, Muthukumaran, Jaya Saxena, and Michael Warren Watzke.

FIELD OF THE INVENTION

The present invention relates to distributed relational database systems and in-memory processing, and more particularly, an improved system and method for performing in-memory hash join processing providing more efficient utilization of memory bandwidth and CPU throughput.

BACKGROUND OF THE INVENTION

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information. Within large corporations or organizations, a database system known as an enterprises data warehouse, may contain close to a petabyte of critical data, organized into hundreds of tables, used by many thousands of persons, performing tasks across all business or organization functions. To perform essential functions, it must operate efficiently and reliably every second of every day.

In-memory processing capabilities have recently been implemented within database systems, where data is stored and processed in CPU memory, offering much faster processing times than systems and applications limited to processing data in non-volatile or persistent storages, e.g., Hard Disk Drives (HDDs), Solid State Disk Drives (SSDs), and Flash memory.

Within relational database systems, a join operation is executed to combine records from two or more tables. A hash join is one form of join well suited to in-memory processing. In a hash join, one or both tables to be joined are fit completely inside CPU memory, with the smaller table being built as a hash table in memory, and potential matching rows from the second table are searched against the hash table.

Described below is an improved system and method for performing in-memory hash join processing providing more efficient utilization of memory bandwidth and CPU throughput.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
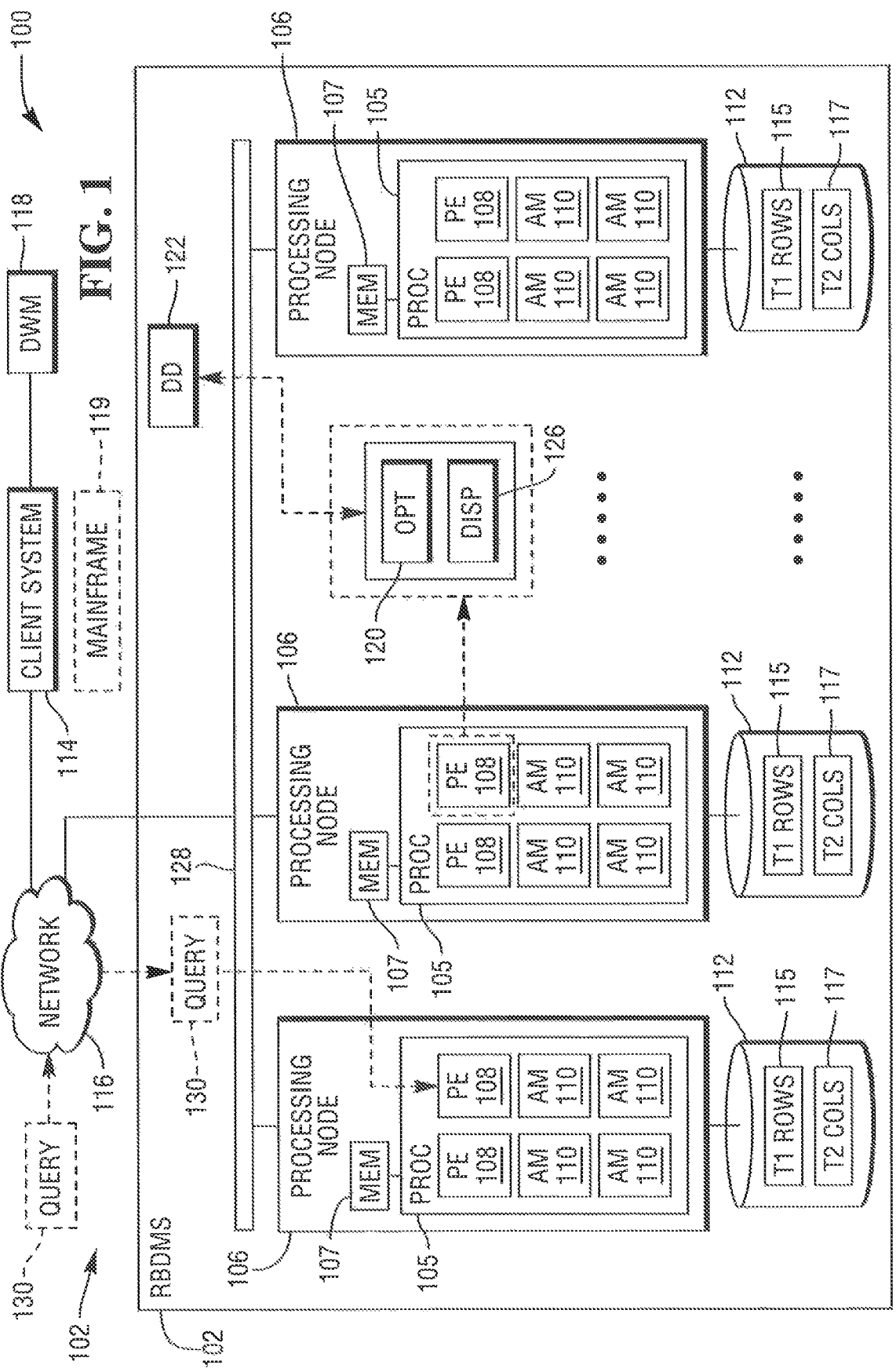
FIG. 1 is a block diagram of an example distributed relational database system.
Figure 2:
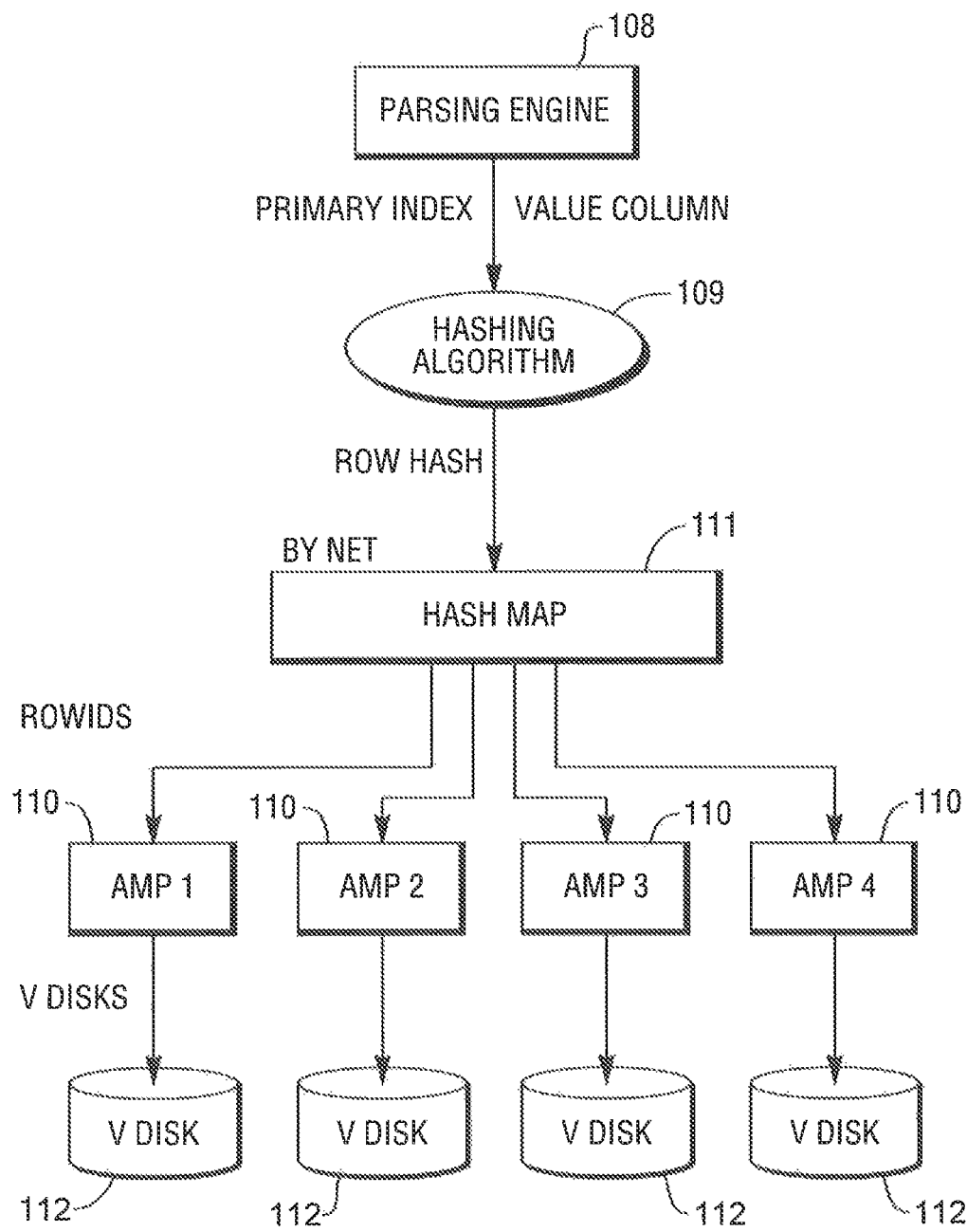
FIG. 2 provides an illustration of a hashing process for distributing records in a table across database modules.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

Figure 4:
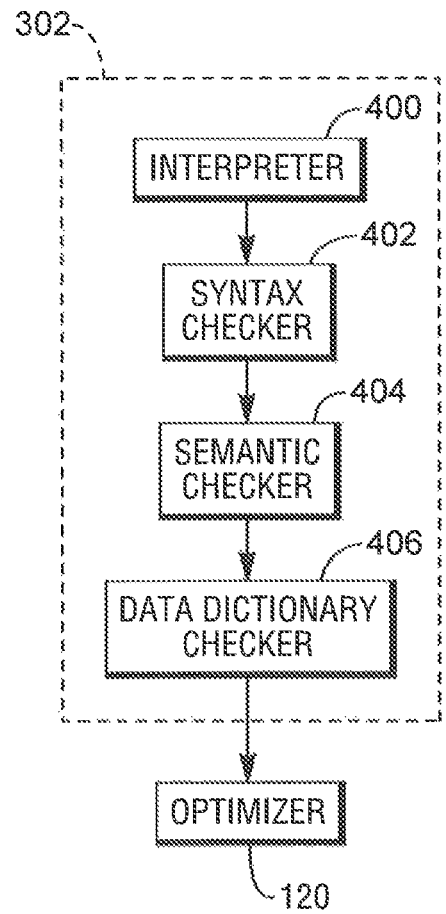
FIG. 4 is a block diagram of another portion of the example database system of FIG. 1.

The RBDMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP. FIG. 4 provides an illustration of this hashing process. A hashing algorithm 109 produces hash values from the values in the columns specified by the primary index. Some portion, possibly the entirety, of the hash value is designated a "hash bucket." The hash buckets are assigned to DSFs 112 and associated access modules 110 by a hash bucket map 111. The characteristics of the columns chosen for the primary index determine how evenly the rows are distributed.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 3 and 4. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 3), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 3:
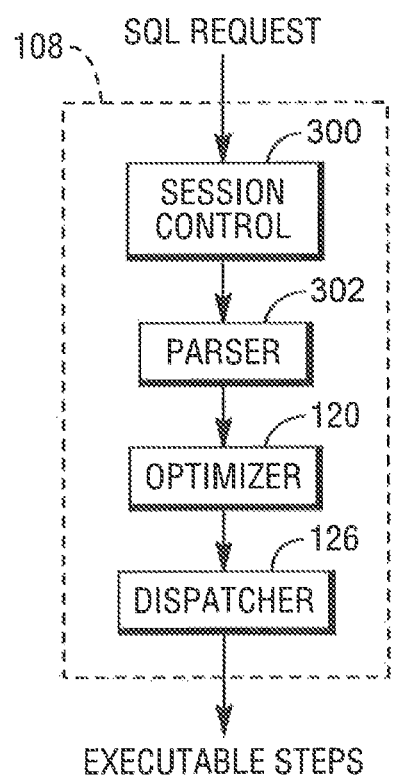
FIG. 3 is a block diagram of a portion of the example database system of FIG. 1.

In one example system, each parsing engine module 108 includes three primary components: a session control module 300, a parser module 302, and a dispatcher module 126 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

As illustrated in FIG. 4, the parser module 302 may include an interpreter module 400 that interprets the SQL request. The parser module 302 may also include a syntax checker module 402 that checks the request for correct SQL syntax, as well as a semantic checker module 304 that evaluates the request semantically. The parser module 302 may additionally include a data dictionary checker 406 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

As stated earlier, the present invention is directed to an improved system and method for performing in-memory hash join processing providing more efficient utilization of memory bandwidth and CPU throughput. A hash join is one of the plans suggested by the optimizer module based on joining conditions. Hash Join gets its name from the fact that one smaller table is built as a "hash-table", and potential matching rows from the second table are searched by hashing against the smaller table. Typically, the optimizer module will first identify a smaller table, and then sort it by the join column row hash sequence. If the smaller table can fit entirely in memory, the performance will be best. The larger table is processed one row at a time by doing a binary search of the smaller table for a match.

Figure 5:
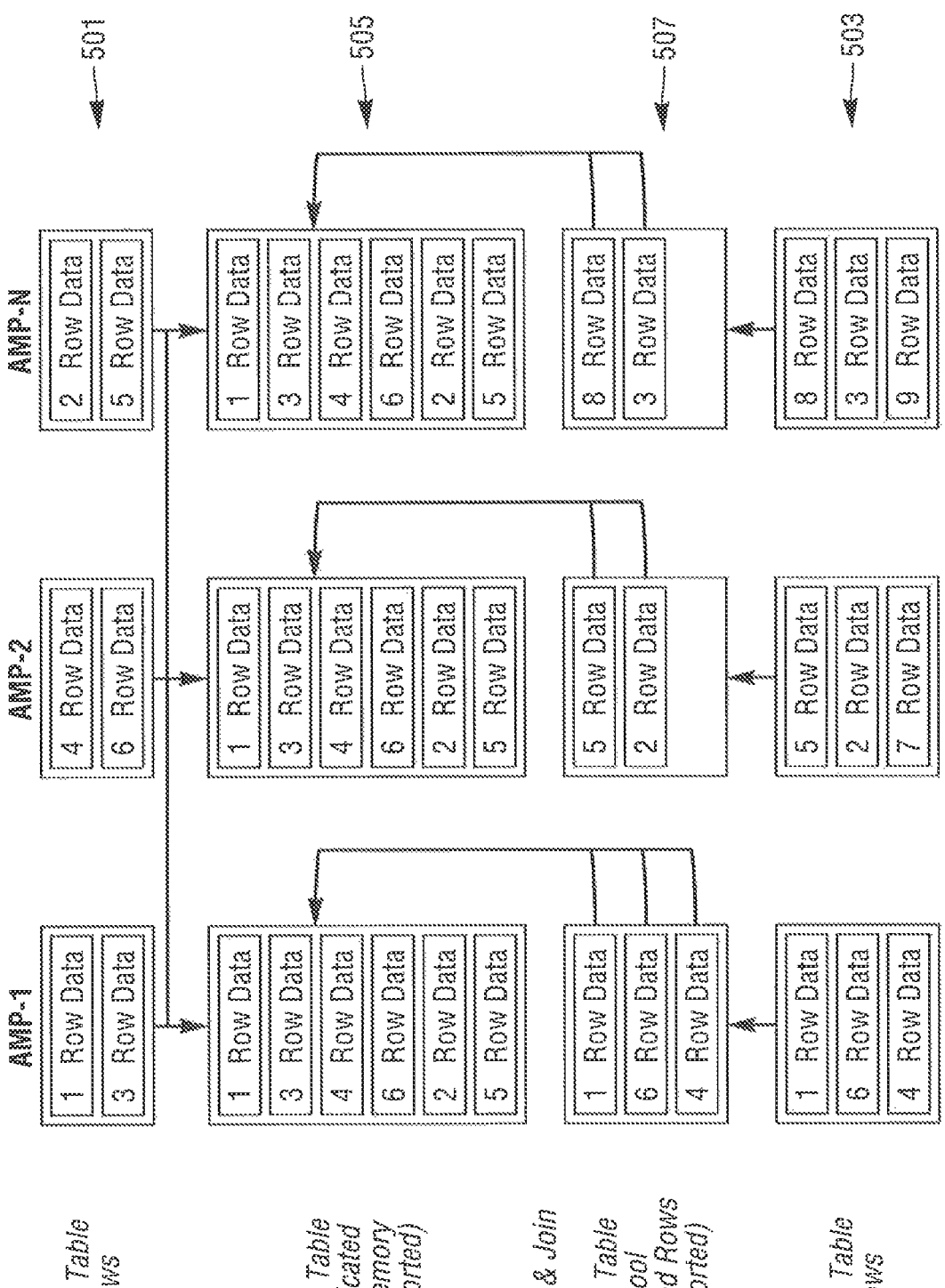
FIG. 5 provides an illustration of a classic hash join operation for joining a small and large table.

FIG. 5 provides an illustration of a classic hash join operation for joining a small and large table. A hash join leverages memory and typically gets chosen by the optimizer module when joining a small table with a very large table using an Inner Join. In the example illustrated in FIG. 5, a small table 501 is shown at the top of the illustration with six rows spread across three AMPs, and a large table 503 is shown at the bottom with nine rows, again spread across the three AMPs. Obviously in a real-world environment, the number of rows for both tables would be much greater, but one requirement for using a hash join is that the small table must fit entirely in memory.

In preparation for the hash join the entire small table 505 is duplicated to memory on each one of the AMPs, e.g. AMP-1, AMP-2 through AMP-N. Each AMP contains the entire small table in memory. The large table is read and all qualifying rows are written into a spool file 507. Spool file 507 is distributed across the three AMPs.

On each AMP, the Hash Join algorithm will examine the corresponding rows in the large spool file 507, and for a row at a time will probe the small table, which sits in memory 505, for hash match. If there are hash match rows, one or more join conditions are evaluated on the rows. Successfully evaluated rows will be written out to another spool file.

Figure 6:
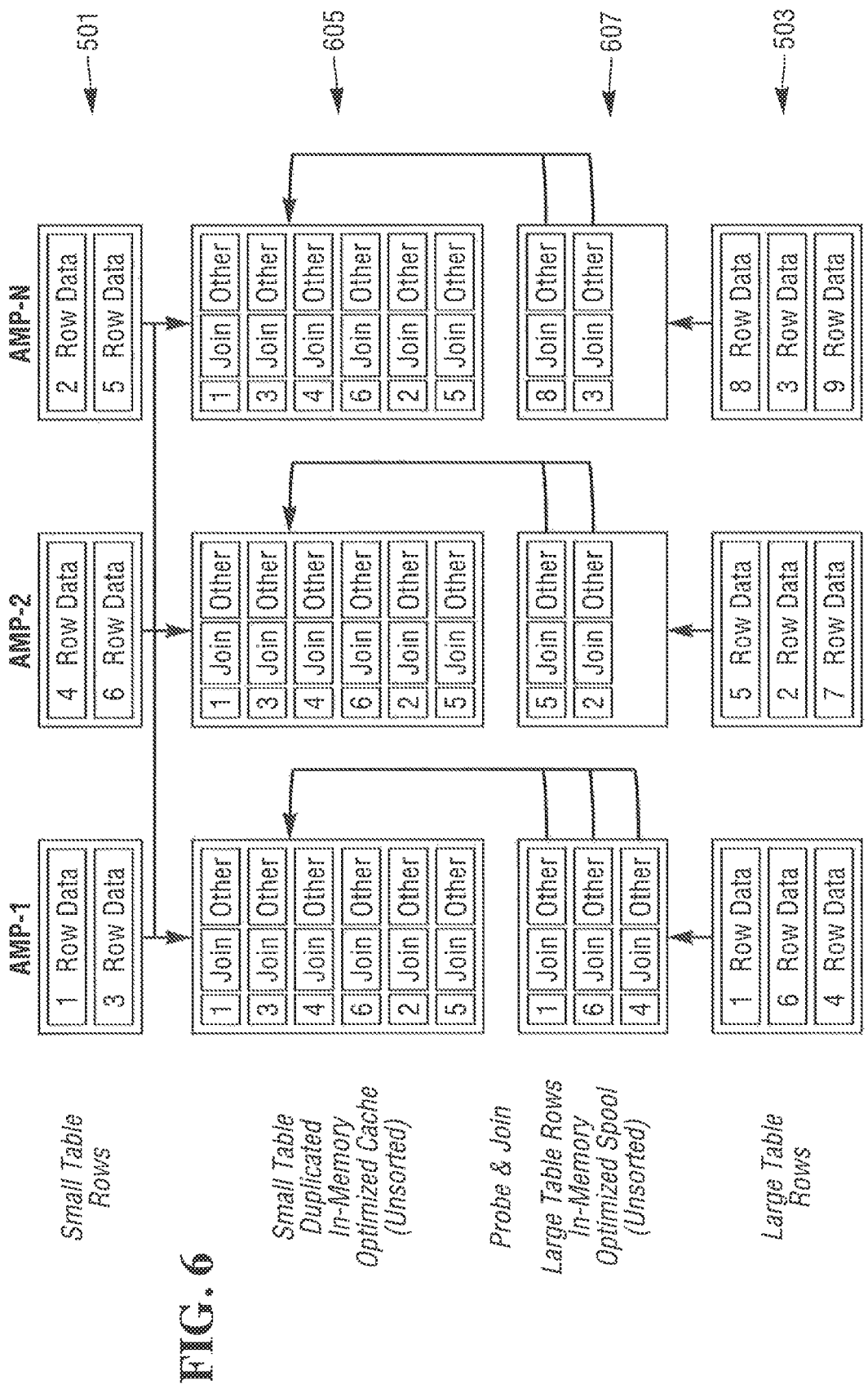
FIG. 6 provides an illustration of an optimized, in-memory, hash join operation for joining a small and large table.

FIG. 6 provides an illustration of an optimized, in-memory, hash join operation for joining small table 501 and large table 503. The entire small table 605 is duplicated to memory on each AMP, and the large table is read and all qualifying rows are written into a spool file 607. However, the in-memory small table 605, and the large table spool file 607 are structured in a different manner than shown in the classic hash join illustrated in FIG. 5, discussed above. The in-memory small table 605, and the large table spool file 607 are no longer comprised of full table rows, but are organized in a cache friendly structure with each comprised of a subset of table columns organized in three columnar containers. The first container holds a hash of join columns, the second container holds the column(s) to be joined on, and the third container holds other data needed from the table to create the answer set. The join will then be performed against these cache friendly structures.

Please note that this feature is engaged when the optimizer module determines it is cheaper than other join techniques, including the classical hash join technique illustrated in FIG. 5, based on data demographics and a cost profile for a given configuration. This feature may be utilized with row-based as well as column-based tables.

Performing in-Memory Hash Joins in Bulk

Performing in-memory hash joins in bulk offers improvements in utilization of memory bandwidth and CPU throughput by reducing unnecessary data movement across the memory bus, reducing memory accesses in the execution path, and reducing CPU cycles per instruction. Data movement is reduced by reducing load-stores to memory and by performing more operations in CPU cache.

Typically, applying bulk processing to product joins is trivial, but memory intensive joins, such as hash joins, present challenges. In a traditional hash join method, for every outer table row the hash table is probed using a hash value. If rows exist in the hash table for this hash value, the join condition is evaluated to match the outer table row with all inner table rows with hash synonyms. The join output is built using each qualified pair of rows from the inner and outer tables. However, this algorithm is unsuitable for single instruction, multiple data (SIMD) or bulk processing, and not DRAM memory access friendly. This is because subsequent rows from an outer table, or probe table, may probe to different areas in the hash table. DRAM memory accesses tend to be very random, causing cache misses and thereby reducing memory bandwidth and resulting in CPU performance penalties.

The bulk processing solution described herein redesigns the hash join process with an aim to:

Improve memory access patterns,
Enable effective use of SIMD instructions,
Help improve memory bandwidth, and
Improve cache payload efficiency.

These goals are achieved by bulking each step of the in-memory hash join process. Bulking helps reduce random memory access patterns and enables use of an array programming model. Array like data accesses also help in improving cache efficiency, improving memory bandwidth and enabling vector processing. Typical implementation for using SIMD in hash join processing will duplicate outer table join column values for every matching hash synonyms in the hash table. However, there are not always enough synonyms present which can exploit full SIMD register capability. Such a scenario is possible when an inner table, or table from which the hash table is built, is mostly unique. Following outlines, the modified algorithm for in-memory hash join processing resolves this issue and can use SIMD, even for unique tables, and includes other improvements to keep memory access patterns fairly predictable.

Figure 7:
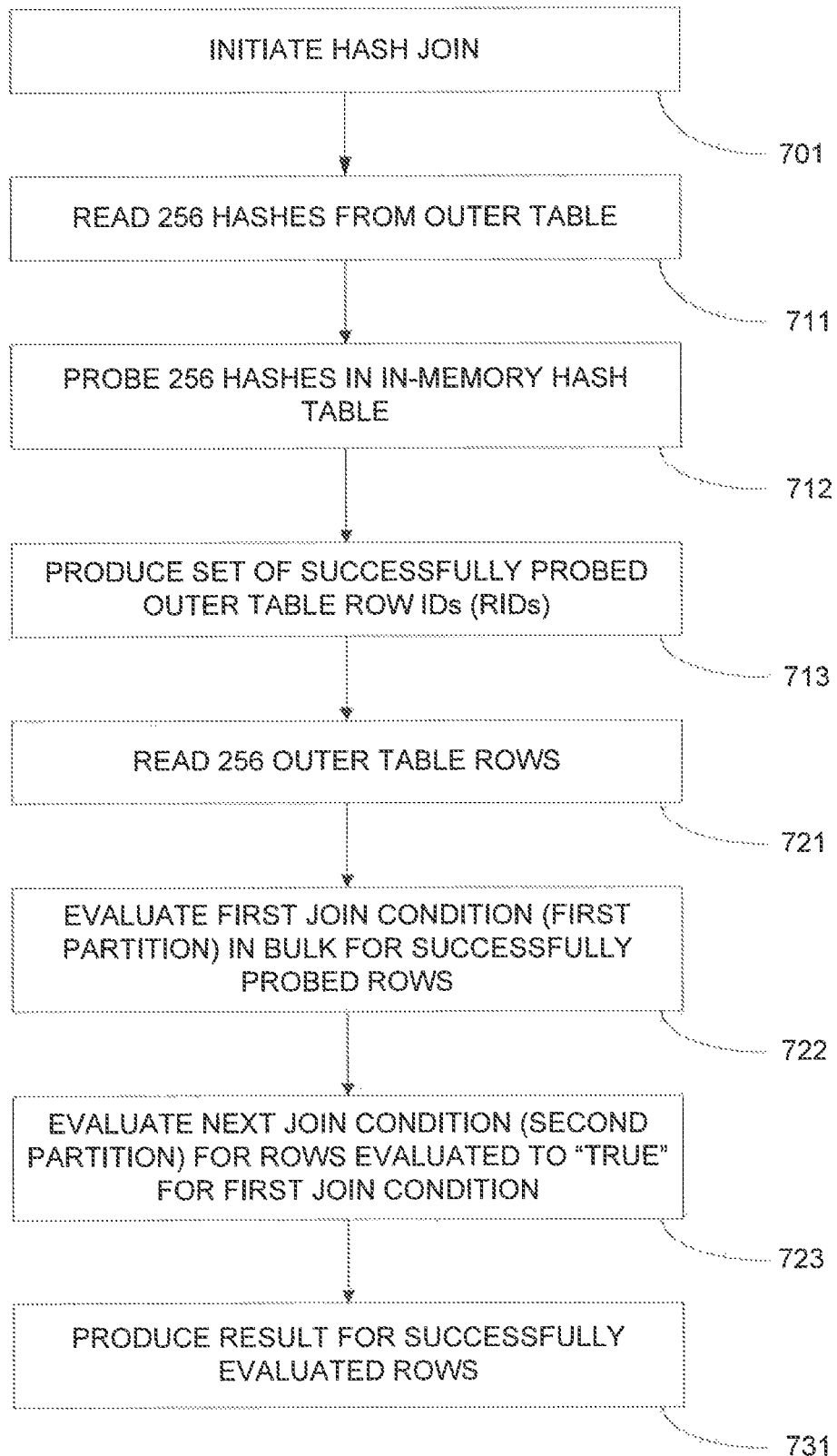
FIG. 7 is a flow diagram illustrating a method for performing in-memory hash join processing, in accordance with the present invention.

The flowchart of FIG. 7 illustrates one embodiment of the process for performing in-memory hash joins in bulk. In the example illustrated, the process joins a small, or inner, table residing in-memory with a large, or outer, table. Following initiation of the hash join (step 701) the process reads 256 hashes from the outer table (step 711). When outer table is an in-memory optimized spool, reading 256 hashes helps improve the memory access pattern. The process continues with probing the 256 hashes in the in-memory hash table (step 712) to produce a set of successfully probed outer table row IDs (step 713).

Join condition evaluation follows with a reading of successfully probed outer table rows (step 721). When the outer table is an in-memory optimized spool, this step reads from a column partition ensuring a memory access is not too random. A first join condition (first partition) is evaluated in bulk for the successfully probed rows (step 722). In SIMD applications, for each outer table row, join column values are duplicated in a SIMD register as the number of hash synonyms until the SIMD register is filled completely. If the SIMD register is not filled, then the next outer table row is read, and this procedure is repeated. Another SIMD register is loaded with join column values from the hash table and complete the evaluation using SIMD instructions. A second or next join condition (second partition) is evaluated for those rows which are evaluated to true in first evaluation (step 723). The procedure described above for the first join condition evaluation is also employed for the second join condition evaluation when loading data into SIMD registers. A result set containing all successfully evaluated rows is produced (step 731).

The process for performing hash join processing in bulk described above and illustrated in the accompanying figures is cache friendly, suitable for join condition evaluation using SIMD processing, and improves DRAM memory bandwidth.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A method for performing a hash join between an inner table and an outer table in a distributed relational database system, the method comprising the steps:
    reading a plurality of hash values from said outer table;
    probing said plurality of hash values in said inner table;
    producing a set of successfully probed outer table row ids;
    reading outer table rows corresponding to said outer table row ids;
    evaluating at least one join condition on said outer table rows corresponding to said outer table row ids in bulk; and
    building a result set of successfully evaluated outer table rows.

2. The method for performing a hash join between an inner table and an outer table in a distributed relational database system in accordance with claim 1, wherein:
    said step of evaluating at least one join condition on said outer table rows corresponding to said outer table row ids in bulk comprises single instruction, multiple data (SIMD) processing.

3. The method for performing a hash join between an inner table and an outer table in a distributed relational database system in accordance with claim 1, wherein:
    said inner table resides in processor memory.

4. The method for performing a hash join between an inner table and an outer table in a distributed relational database system in accordance with claim 3, wherein:
    said outer table is a spool table residing in processor memory.

5. The method for performing a hash join between an inner table and an outer table in a distributed relational database system in accordance with claim 1, wherein:
    said plurality of hash values comprises 256 hash values.

6. The method for performing a hash join between an inner table and an outer table in a distributed relational database system in accordance with claim 1, wherein said step of evaluating at least one join condition comprises:
    evaluating a first join condition on said outer table rows corresponding to said outer table row ids in bulk; and
    evaluating a second join condition on rows evaluated as "true" for said first join condition.

7. A method for performing a hash join between an inner table and an outer table in a distributed relational database system, the method comprising the steps:
    performing a bulk read of hash values from said outer table;
    performing a bulk probe of said hash values in said inner table;
    producing a set of successfully probed outer table row ids;
    reading outer table rows corresponding to said outer table row ids;
    evaluating at least one join condition for said outer table rows corresponding to said outer table row ids in bulk; and
    producing a result set containing successfully evaluated outer table rows.

8. The method for performing a hash join between an inner table and an outer table in a distributed relational database system in accordance with claim 7, wherein:
    said step of evaluating at least one join condition for said outer table rows corresponding to said outer table row ids in bulk comprises single instruction, multiple data (SIMD) processing.

9. The method for performing a hash join between an inner table and an outer table in a distributed relational database system in accordance with claim 7, wherein:
    said inner table resides in processor memory.

10. The method for performing a hash join between an inner table and an outer table in a distributed relational database system in accordance with claim 9, wherein:
    said outer table is a spool table residing in processor memory.

11. The method for performing a hash join between an inner table and an outer table in a distributed relational database system in accordance with claim 7, wherein:
    said bulk read of hash values comprises reading 256 hash values.

12. The method for performing a hash join between an inner table and an outer table in a distributed relational database system in accordance with claim 7, wherein said step of evaluating at least one join condition comprises:
  evaluating a first join condition for said outer table rows corresponding to said outer table row ids in bulk; and
  evaluating a second join condition on rows evaluated as true for said first join condition.

\* \* \* \* \*